(12) United States Patent
Kaiser et al.

(10) Patent No.: US 8,024,865 B2
(45) Date of Patent: Sep. 27, 2011

(54) CLAMPING DEVICE FOR A JIGSAW

(75) Inventors: Hans Kaiser, Leuzigen (CH); Marcel Casota, Gelterkinden (CH); Daniel Saegesser, Langenthal (CH)

(73) Assignee: Robert Bosch GmbH, Stuttgart (DE)

( * ) Notice: Subject to any disclaimer, the term of this patent is extended or adjusted under 35 U.S.C. 154(b) by 710 days.

(21) Appl. No.: 12/094,662

(22) PCT Filed: Jul. 31, 2007

(86) PCT No.: PCT/EP2007/057891
§ 371 (c)(1),
(2), (4) Date: May 22, 2008

(87) PCT Pub. No.: WO2008/034666
PCT Pub. Date: Mar. 27, 2008

(65) Prior Publication Data
US 2008/0289198 A1 Nov. 27, 2008

(30) Foreign Application Priority Data
Sep. 18, 2006 (DE) .......................... 10 2006 043 682

(51) Int. Cl.
*B27B 19/09* (2006.01)
*B23D 51/10* (2006.01)
(52) U.S. Cl. ............................. 30/392; 30/339; 279/78
(58) Field of Classification Search ............ 30/392–394, 30/339; 279/77, 78
See application file for complete search history.

(56) References Cited

U.S. PATENT DOCUMENTS

| 5,306,025 | A | * | 4/1994 | Langhoff | 279/90 |
| 5,946,810 | A | * | 9/1999 | Hoelderlin et al. | 30/392 |
| 6,053,675 | A | * | 4/2000 | Holland et al. | 408/239 R |
| 6,209,208 | B1 | * | 4/2001 | Marinkovich et al. | 30/392 |
| 6,725,548 | B1 | * | 4/2004 | Kramer et al. | 30/392 |
| 6,735,876 | B2 | * | 5/2004 | Hirabayashi | 30/392 |
| 7,251,897 | B2 | * | 8/2007 | Shuhua | 30/392 |
| 7,861,418 | B2 | * | 1/2011 | Kretschmar et al. | 30/392 |
| 7,871,080 | B2 | * | 1/2011 | Marini et al. | 279/71 |
| 2008/0289198 | A1 | * | 11/2008 | Kaiser et al. | 30/514 |

FOREIGN PATENT DOCUMENTS

EP 1 236 530 9/2002
EP 1 468 771 10/2004

* cited by examiner

*Primary Examiner* — Hwei C Payer
(74) *Attorney, Agent, or Firm* — Michael J. Striker

(57) ABSTRACT

The invention relates to a clamping device (8) for connecting a saw blade (12) to a reciprocating rod (6) of a jig saw, in particular a hand-operated compass saw (2), comprising a mounting (20), which is connected to the reciprocating rod (6) and has a recess (22) for receiving a head end (10) of the saw blade (12), a locking sleeve (30), which can be turned about the axis (40) with respect to the mounting (20) against the force of a torsion spring (60) to lock the head end (10) of the saw blade (12) in a locking position in the recess (22) and to allow removal of the saw blade (12) in a removal position. It is intended that a stop (78) interacts with a part (80) of the torsion spring (60), in order to prevent movement of the locking sleeve (30) beyond the removal position.

11 Claims, 4 Drawing Sheets

CLAMPING DEVICE FOR A JIGSAW

The present invention relates to a clamping device and to a jig saw within which the clamping device is included.

Clamping devices designed to clamp a saw blade in a jig saw serve to connect the saw blade in a fixed manner with a motor-driven reciprocating rod of the jig saw, the objective being to lock the saw blade in position with as little movement as possible and in a defined position relative to the holder, to attain a good and precise sawing result.

RELATED ART

A clamping device of the type described initially is made known in EP 1 236 530 B1. This clamping device makes it possible to replace the saw blade quickly and easily, and to immobilize saw blades of different thicknesses in a defined position in the slot-shaped recess of the holder, since the rotatable locking sleeve—which is referred to as a blade guide in EP 1 236 530 B1—reaches behind two lateral projections of the saw blade when rotated out of the release position and into the locked position, thereby preventing the saw blade from moving out of the holder recess, and also ensuring—via the action of the curved surface of the cam element on the contact element inserted in a guide opening of the holder—that the contact element is pressed against a broadside of the saw blade, in order to press the saw blade via its opposite broadside against the adjacent boundary wall of the recess, thereby ensuring that the saw blade is fixed in position, regardless of its thickness.

With the known clamping device, the cam element of the locking sleeve is provided with stop regions on both end faces of the curved surface, each of which is formed by an end section of the cam element that is bent inward in the shape of a hook, the cam element being located radially inwardly from the cylindrical torsion spring in an annular intermediate space between the cylindrical outer circumferential surface of a part of the holder and the inner side of a cylindrical outer wall of the locking sleeve. The two inwardly bent end sections of the cam element, which serve as stop regions, impact—from opposite sides—an outwardly pointing, thicker top part of the contact element when the locking sleeve is in the release position or a home or starting position, in which a saw blade is not located in the holder and the user is not applying any force to the locking sleeve. In this manner, the locking sleeve may be prevented from rotating past these two end positions.

This design has two disadvantages, however: When a user rotates the locking sleeve into the release position using a swiveling lever and presses on the swiveling lever with a great deal of force, one bent end section of the cam element of the locking sleeve impacts the top part of the contact element with strong force, due to the lever effect. This may cause the end section to become bent or the contact element to become tilted in the guide opening of the holder. The risk that the end section will bend is increased further by the fact that, in the release position, the distance is greatest between the curved surface and the top part of the contact element, so that the bent end section—in the radial direction—must extend relatively far inward beyond an adjacent section of the cam element, so that it impacts the top part. The relatively large overhang of the bent end section may also result in its becoming jammed in the annular gap between the outer circumferential surface of the holder and the inner circumference of the cylindrical torsion spring.

The object of the present invention, therefore, is to improve the known clamping device such that the locking sleeve is prevented from being rotated past the release position, without the risk of the contact element becoming tilted, and without the risk of damage occurring to the cam element with the curved surface.

DISCLOSURE OF THE INVENTION

This object is attained according to the present invention in that the stop interacts with a part of the torsion spring to prevent the locking sleeve from rotating past the release position.

Preferably, the part of the torsion spring that interacts with the stop abuts an end face of the torsion spring inserted in a recess of the holder. The part that interacts with the stop extends radially outwardly past the holder and passes through the annular gap surrounding the holder.

This has the advantage that the same end section of the cam element with the curved surface may be used to prevent the locking sleeve from rotating in a direction past the release position, and to prevent the locking sleeve from rotating in the opposite direction past the home or starting position, in which the locking sleeve is rotated by the torsion spring when a saw blade is not located in the recess of the holder. As with the clamping device made known in EP 1 236 530 B1, when in the home or starting position, the end section advantageously impacts a side of the thicker head part of the contact element to prevent the locking sleeve from rotating past the home or starting position. In other words, the stop regions, which limit the angle of rotation in both directions, only need to be placed on or near an end face of the cam element with the curved surface.

In addition, the end face of the cam element does not need to be bent in order to form the stop region that comes in contact with the torsion spring, thereby making it possible to improve its deformation resistance. Particularly strong resistance is attained when the end face of the cam element is extended slightly past the stop region that impacts the top part of the contact element when in the home or starting position, and it is also somewhat thicker in design, this end face then forming the stop region that impacts the torsion spring. Since the end face is essentially oriented in the direction of motion of the cam element when it impacts the torsion spring, the cam element has great rigidity in the direction of impact.

The angular position in which the end face of the cam element impacts the torsion spring may be attained by changing the angular orientation of the opening in the holder—which serves to receive the end face of the torsion spring—and/or by extending the end face of the cam element past the section that serves as stop region when in the home or starting position.

As an alternative, it would be feasible, however, to use the opposite end face of the cam element in the home or starting position as the stop for limiting the rotary motion of the locking sleeve by extending the cam element at this end so far that, in the home or starting position, it impacts—from the opposite side—the part of the torsion spring that serves as the stop for the cam element in the release position.

BRIEF DESCRIPTION OF THE DRAWING

The present invention is described in greater detail below with reference to an exemplary embodiment shown in the drawing.

EMBODIMENT OF THE INVENTION

Figure 1:
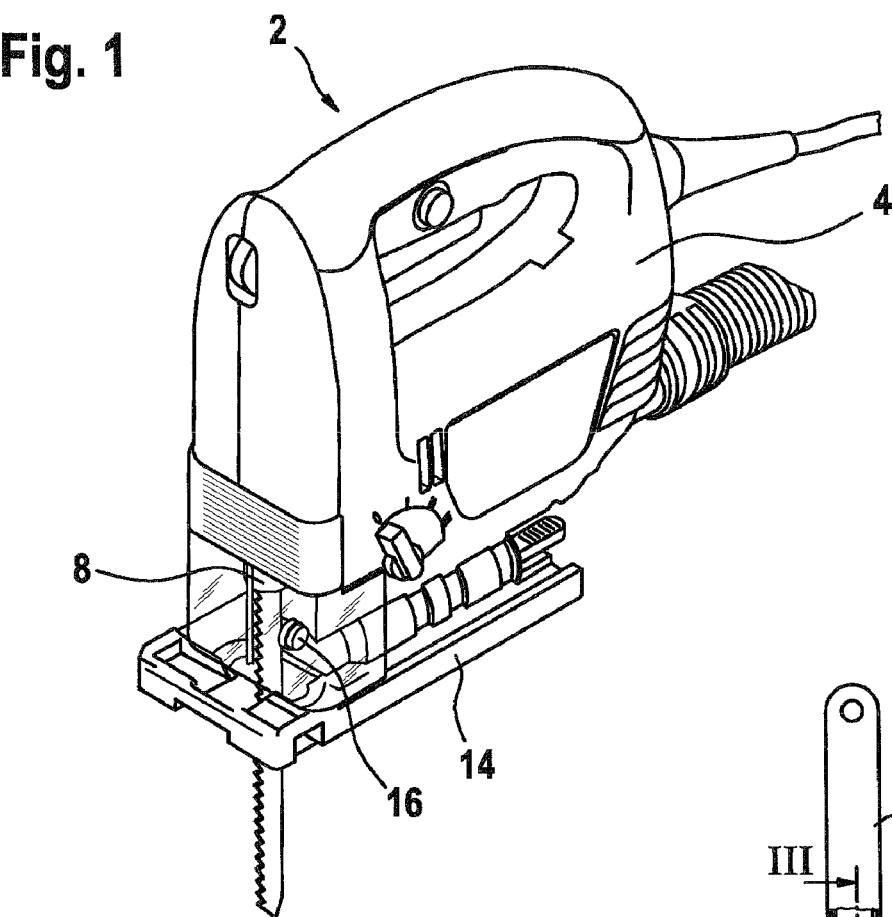
FIG. 1 shows a perspective view of a compass saw with a saw blade clamped in place.

Hand-guided compass saw 2 shown in FIG. 1 includes—in a known manner—a housing 4, an electric motor with a not-shown transmission located inside housing 4, a reciprocating rod 6 that is driven in a linear motion by the electric motor via the transmission and that may be moved back and forth and up and down, a clamping device 8 located on the free end of reciprocating rod 6 for clamping a top end 10 of a saw blade 12, and a support roller unit 16 located between clamping device 8 and an adjustable base plate 14 of compass saw 2 for supporting a saw blade back 18 of saw blade 12.

As shown best in FIGS. 3 through 8, clamping device 8 includes a holder 20, which is rigidly connected with the lower free end of reciprocating rod 6. Holder 20 is provided with a recess 22 that has a rectangular cross section, is open toward the bottom, and is slot-shaped, into which top end 10 of saw blade 12 may be inserted from below and then locked in place in holder 20.

Figure 2:
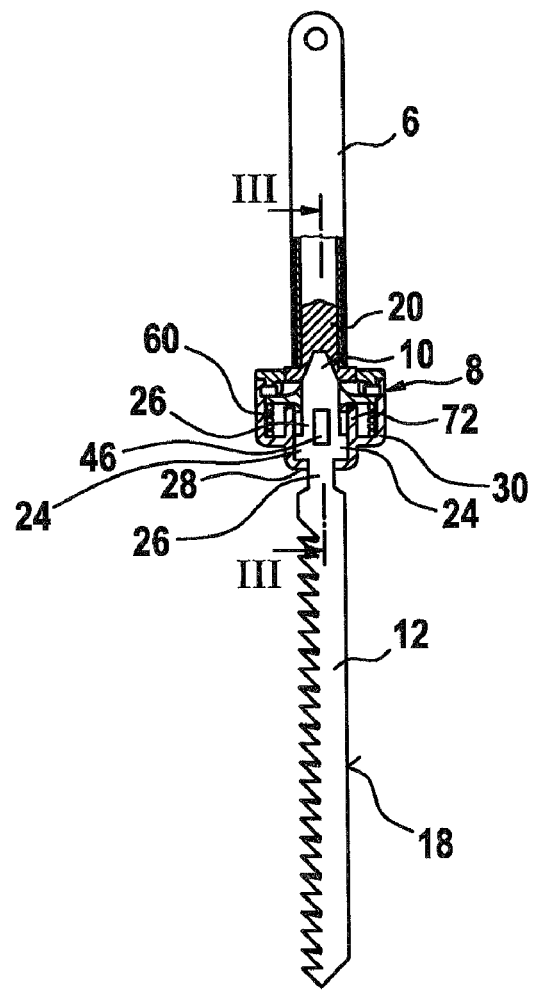
FIG. 2 shows a longitudinal sectional view of a reciprocating rod and a clamping device of the compass saw with a saw blade.

To this end, as shown in FIG. 2, top end 10 of saw blade 12 is provided with two diametrically opposed lateral projections 24 and a narrower neck section 26 beneath projections 24, so that, after top end 10 of saw blade 12 has been inserted in recess 22 of holder 20, projections 24 may be gripped from underneath by lower end face 28 of a locking sleeve 30 that encloses holder 20, in order to hold top end 10 of saw blade 12 in position in recess 22 such that it is fixed in position in the axial direction.

Holder 20 also has an upper part 32 with a larger diameter, and a lower part 34 with a smaller diameter, and it is largely enclosed—except for an upper dust-protection cap 36—by locking sleeve 30, which is hollow-cylindrical and stepped in design, and which is attached to holder 20 using a snap ring 38 such that it may rotate around a longitudinal axis 40 of reciprocating rod 6 between two defined end positions.

Figure 3:
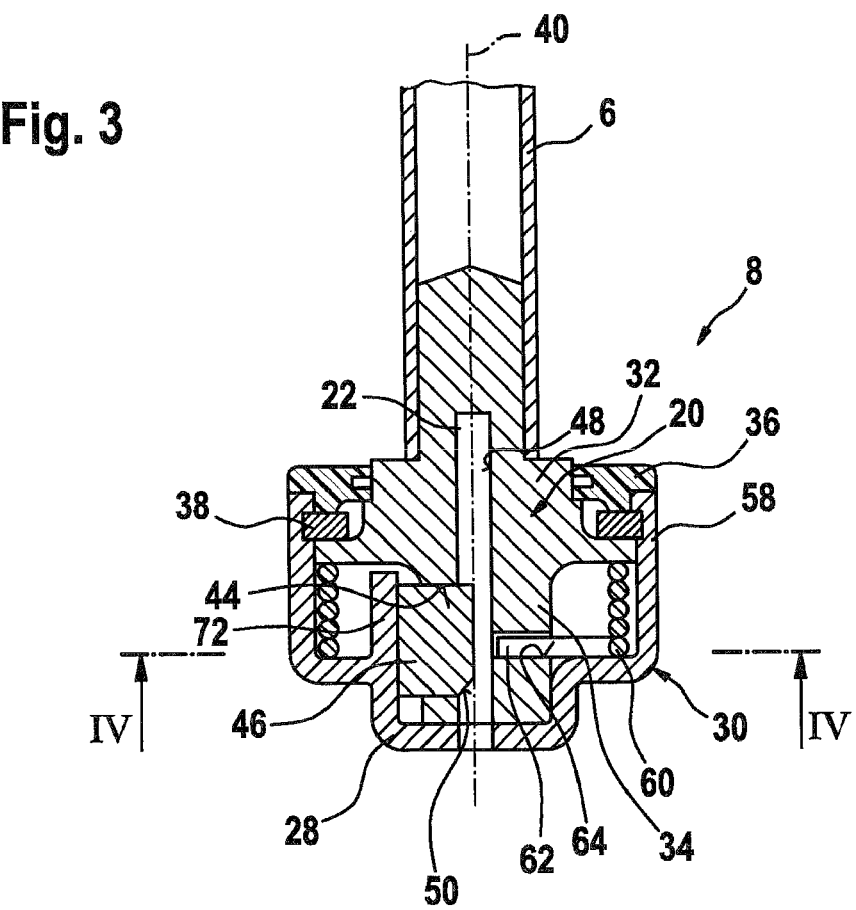
FIG. 3 is an enlarged sectional view of the clamping device along the line III-III in FIG. 2, but without a saw blade clamped in place, and with the locking sleeve in a home or starting position.
Figure 4:
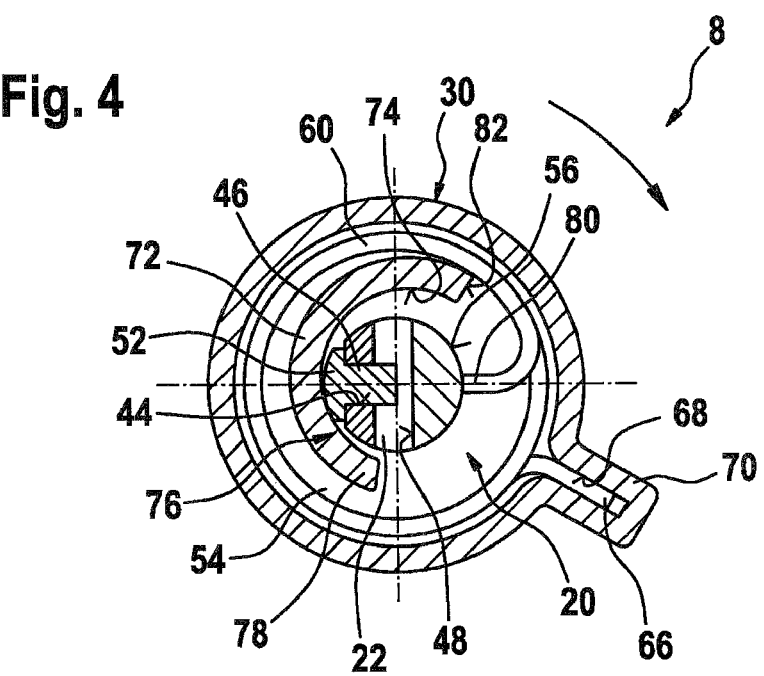
FIG. 4 is an enlarged cross-sectional view of the clamping device along the line IV-IV in FIG. 3.

The first end position, which is shown in FIGS. 3 and 4 and is referred to as the home or starting position, is the position in which locking sleeve 30 is located when a saw blade 12 has not been inserted in recess 22 and no rotary force is being applied by a user to locking sleeve 30.

Figure 5:
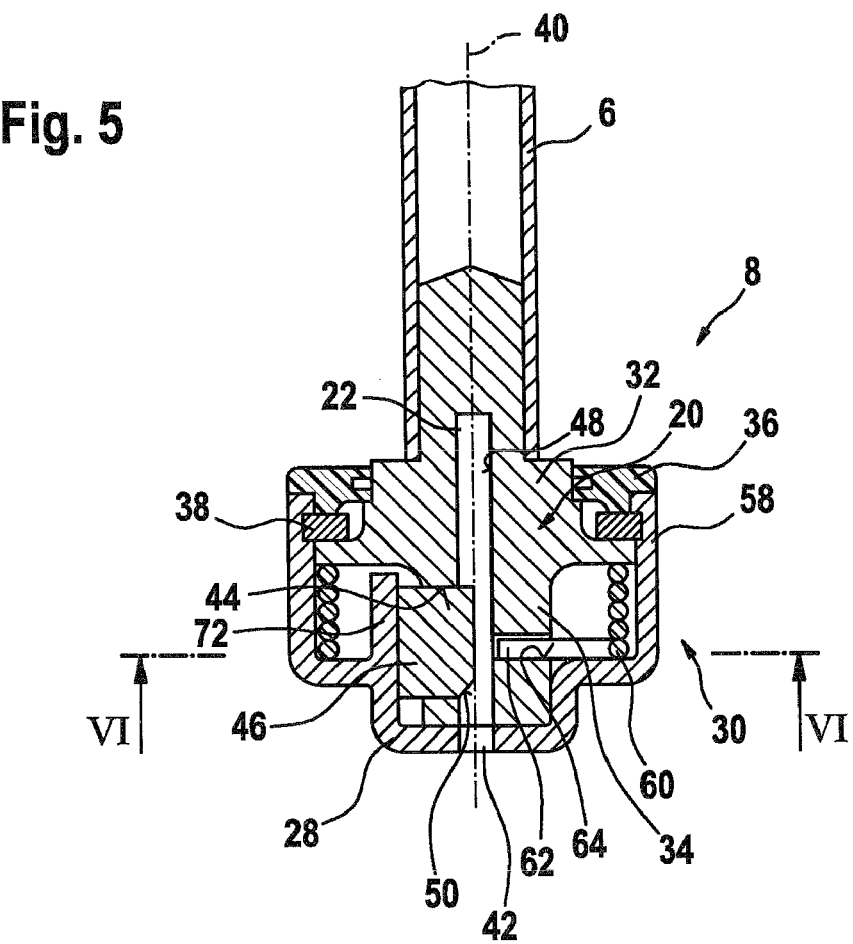
FIG. 5 is an enlarged sectional view of the clamping device without a saw blade clamped in place, as in FIG. 3, but with the locking sleeve in a release position.
Figure 6:
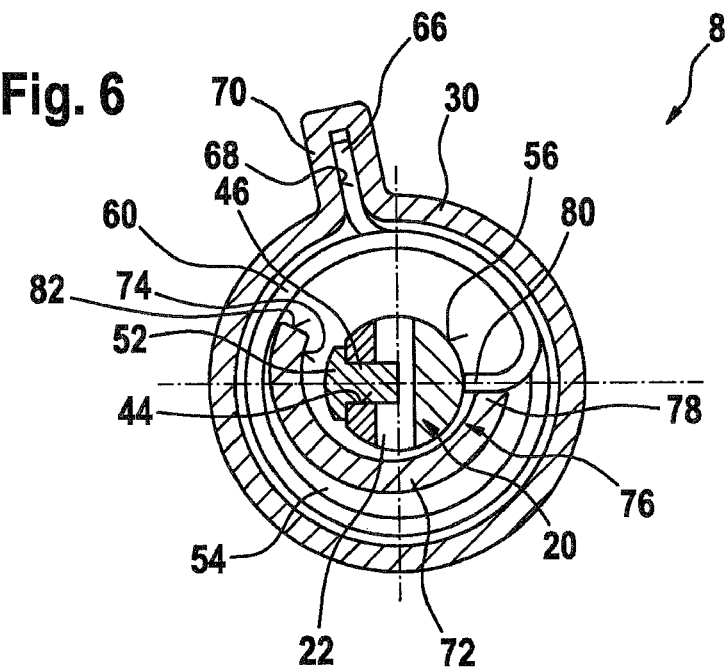
FIG. 6 is an enlarged cross-sectional view of the clamping device along the line VI-VI in FIG. 5.

The second end position, shown in FIGS. 5 and 6, is the release position, in which a rectangular slot opening 42 in lower end face 28 of locking sleeve 30 is aligned with recess 22—which has a rectangular cross section—in holder 20 so that top end 10 of saw blade 12, including projections 24, may be inserted into recess 22 from the bottom through slot opening 42.

Figure 7:
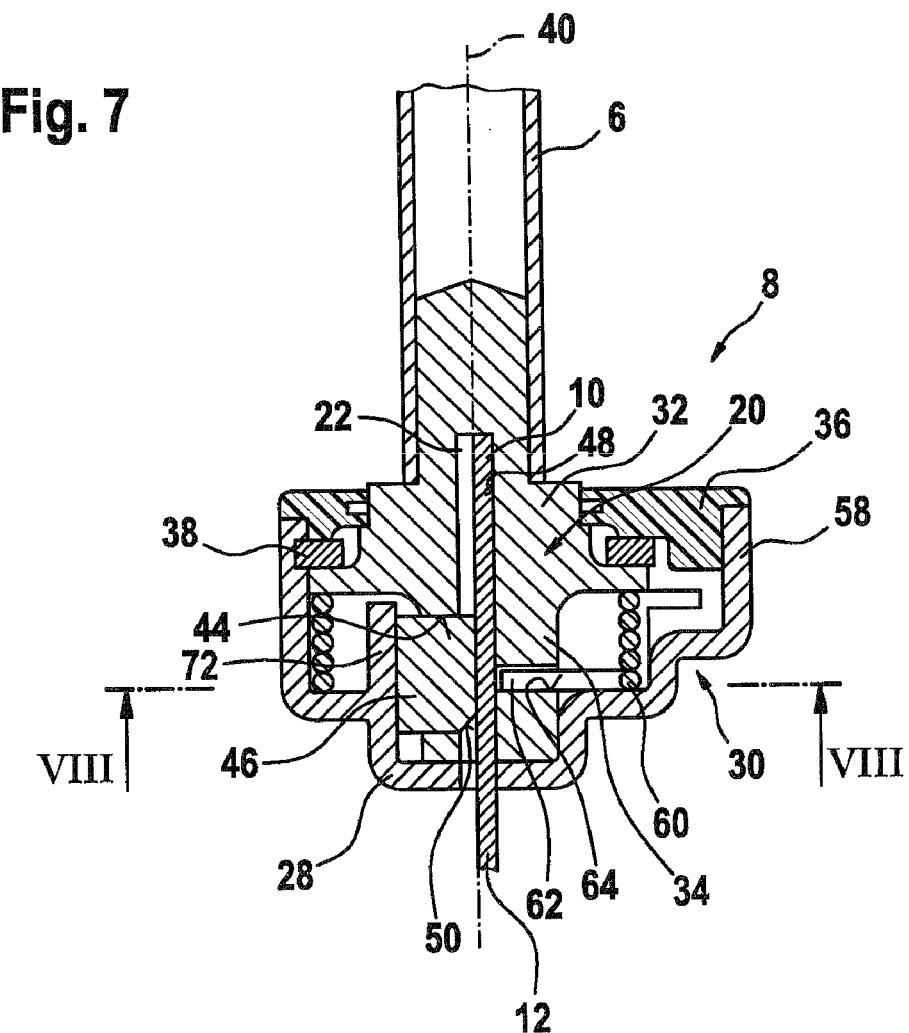
FIG. 7 is an enlarged sectional view of the clamping device as shown in FIGS. 3 and 5, but with a saw blade clamped in place and with the locking sleeve in a release position.
Figure 8:
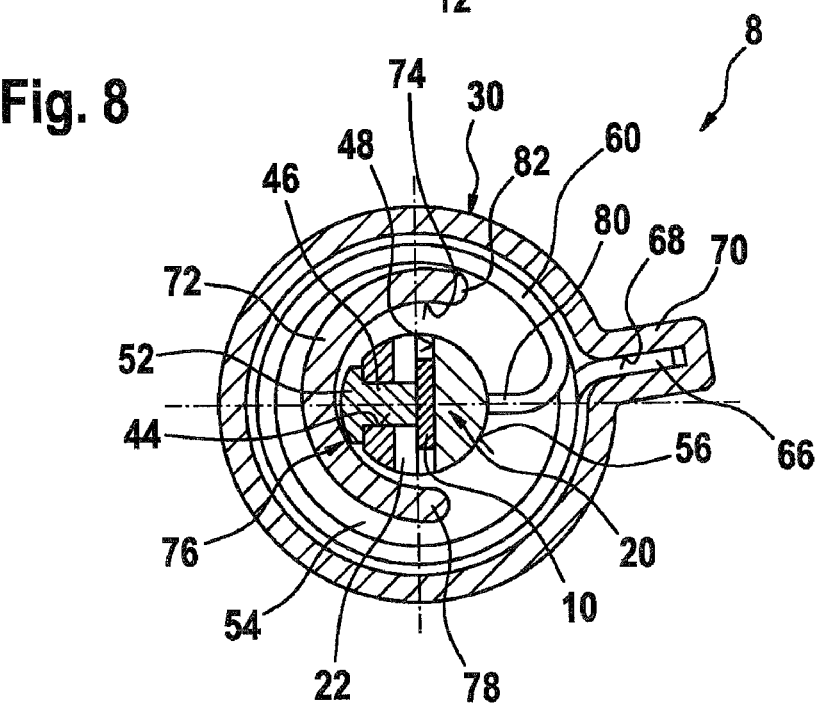
FIG. 8 is an enlarged cross-sectional view of the clamping device along the line VIII-VIII in FIG. 7.

The locked position shown in FIGS. 7 and 8 is located between the home or starting position and the release position. In the locked position, diametrically opposed edges of slot opening 42 in lower end face 28 of locking sleeve 30 reach behind the two projections 24 of saw blade 12, as shown best in FIG. 2, thereby preventing saw blade 12 from moving axially out of recess 22.

A guide opening 44 oriented transversely to longitudinal axis 40 of reciprocating rod 6 is located in the lower part of holder 20, in which a contact bolt 46 is inserted such that it is displaceble transversely to longitudinal axis 40. Contact bolt 46 serves to press top end 10 of saw blade 12—when inserted in recess 22 and in the locked position—against a boundary wall 48 of recess 22 that is diametrically opposed to contact bolt 46, in order to hold top end 10 of saw blade 12 in a defined position against boundary wall 48, regardless of its thickness, thereby ensuring that saw blade 12 is positioned evenly and precisely. To this end, contact bolt 46 must be slid into recess 22 that much further, the thinner saw blade 12 is.

Contact bolt 46 with the rectangular cross section has a bevel 50 on the underside of its inner end that extends into recess 22, so that, when top end 10 of saw blade 12 is inserted into recess 22, it is displaced outwardly until top end 10 of saw blade 12 may pass between the free end of contact bolt 46 and boundary wall 48, and into recess 22.

Contact bolt 46 also includes an expanded top part 52, which extends into an annular intermediate space 54 between a cylindrical circumferential surface 56 of lower part 34 of holder 20 and the inner side of outer wall 58 of an expanded top part of locking sleeve 30.

A helically coiled torsion spring 60 is located in intermediate space 54, whose end face 62 is bent radially inwardly and, opposite to the free end of contact bolt 46, is inserted into a radial receiving opening 64 in lower part 34 of holder 20, and whose other end face 66 is bent radially outwardly and is inserted into a receiving opening 68 of a hollow projection 70 that projects radially outwardly beyond the outer side of locking sleeve 30. Torsion spring 60 serves to rotate locking sleeve 30 in the home or starting position, or in the locking position when saw blade 12, in the release position, is removed from recess 22 of holder 20, or when it has been inserted in recess 22 of holder 20, and when a release lever (not shown) that is used to rotate locking sleeve 30 into the release position and that acts on one side of projection 70 has been released by the user.

Intermediate space 54 also serves to receive a cam element 72, which is connected as a single piece with locking sleeve 30, and which extends between torsion spring 60 and 10 circumferential surface 56 of lower part 34 of holder 20 from below into intermediate space 54, as shown best in FIGS. 3, 5, and 6. Cam element 72 is shaped nearly as a semi-spiral winding, and it has a curved surface 74 on its inner side facing holder 20. The distance between curved surface 74 and circumferential surface 56 of lower part 34 of holder 20 decreases in the counter-clockwise direction. As a result, contact bolt 46 is moved by curved surface 74 of cam element 72 that acts on its top part 52 into recess 22, and it is pressed with via free end against the adjacent broadside of top end 10 of saw blade 12 that has been inserted in recess 22, saw blade 22 then being pressed via its opposite broadside against the adjacent boundary wall 48 of recess 22 when locking sleeve 30 is rotated by torsion spring 60 into the locked position in the counter-clockwise direction, i.e., in the direction of the arrow in FIG. 4.

To prevent locking sleeve 30 from rotating in the counter-clockwise direction past the release position shown in FIGS. 5 and 6 when the user replaces saw blade 12, cam element 72 has an elongated end face 78 on the other side of stop region 76, the length of which is selected such that it impacts a part 80 of torsion spring 60 when in the release position. Part 80 of torsion spring 60 abuts end face 62 of torsion spring 60 inserted in receiving opening 64 and extends radially outwardly past holder 20, extending transversely through intermediate space 54.

To prevent locking sleeve 30 from rotating in the counterclockwise direction past the release position shown in FIGS. 5 and 6 when the user replaces saw blade 12, cam element 72 has an elongated end face 78 on the other side of stop region 76, the length of which is selected such that it impacts a part 80 of torsion spring 60 when in the release position. The part 80 of the torsion spring 60 that interacts with the end face 78 extends transversely into the intermediate space 54.

By changing the length of end face 78 of cam element 72 that extends past stop region 76, it is possible to select a desired angle of rotation of locking sleeve 30 between the release position and the home or starting position.

To change this angle of rotation, it would also be possible to locate the end face 62 of the torsion spring 60 at a location other than directly across from the guide opening 44 of contact bolt 46—at an angle to the guide opening 44 relative to axis 40.

It is also possible to eliminate stop region 76 and extend end face 82 of cam element 72—which is diametrically opposed to end face 78—so far that it impacts the opposite side of part 80 of torsion spring 60 (not shown) when in the home or starting position.

What is claimed is:

1. A clamping device for connecting a saw blade to a reciprocating rod of a jig saw, comprising:
    a holder (20), which is connected to the reciprocating rod and has an axis (40) and a recess for receiving a top end of the saw blade, and
    a locking sleeve that is turned about the axis (40) relative to the holder against the force of a torsion spring (60) to lock the top end of the saw blade in a locked position in the recess, and to enable the saw blade to be removed when in a release position,
    wherein a stop (78) interacts with a part (80) of the torsion spring (60) to prevent the locking sleeve (30) from moving past the release position and wherein the part (80) of the torsion spring (60) that interacts with the stop (78) is oriented essentially radially to the axis (40).

2. The clamping device as recited in claim 1, wherein the part (80) of the torsion spring (60) that interacts with the stop (78) extends inwardly past a part (34) of the holder (20).

3. The clamping device as recited in claim 1, wherein the part (80) of the torsion spring (60) that interacts with the stop wherein the torsion spring (60) has an end face (62) inserted into a receiving opening (64) of the holder (20).

4. The clamping device as recited in claim 1, wherein the reciprocating rod (6) is movable back and forth along the axis (40).

5. The clamping device as recited in claim 1, characterized by a contact element (46) for pressing the saw blade (12) against a lateral boundary wall (48) of the recess (22).

6. The clamping device as recited in claim 5, wherein the contact element (46) is movable relative to the holder (20) and transversely to the axis (40).

7. The clamping device as recited in claim 5, wherein the locking sleeve (30) acts on the contact element (46) via a curved surface (74) of a cam element (72) to press the saw blade (12)—when in the locked position—against the boundary wall (48) of the recess (22).

8. The clamping device as recited in claim 7, wherein the cam element (72) is provided with the stop (78) that prevents the locking sleeve (30) from moving past the release position.

9. The clamping device as recited in claim 8, wherein the stop (78) is formed by an end face (78) of the cam element (72) that points essentially in the direction of motion of the cam element (72).

10. The clamping device as recited in claim 7, wherein the cam element (72) is provided with a stop region (76) that prevents the locking sleeve (30) from moving past a home or starting position, and wherein the stop (78) and the stop region (76) are located close to each other on the cam element (72).

11. A jig saw, characterized by a clamping device as recited in claim 1.

\* \* \* \* \*